(12) United States Patent
O'Neal, Jr.

(10) Patent No.: US 11,708,466 B1
(45) Date of Patent: Jul. 25, 2023

(54) PROTECTIVE FILM PRESS AND METHOD OF USE

(71) Applicant: David Leon O'Neal, Jr., Troutman, NC (US)

(72) Inventor: David Leon O'Neal, Jr., Troutman, NC (US)

(*) Notice: Subject to any disclaimer, the term of this patent is extended or adjusted under 35 U.S.C. 154(b) by 1031 days.

(21) Appl. No.: 16/365,633

(22) Filed: Mar. 26, 2019

Related U.S. Application Data

(60) Provisional application No. 62/647,936, filed on Mar. 26, 2018.

(51) Int. Cl.
| | |
|---|---|
| *C08J 5/18* | (2006.01) |
| *B32B 7/12* | (2006.01) |
| *B32B 7/022* | (2019.01) |
| *B32B 33/00* | (2006.01) |
| *B65H 39/045* | (2006.01) |
| *B65H 39/041* | (2006.01) |
| *B29C 65/78* | (2006.01) |
| *B41M 7/00* | (2006.01) |

(52) U.S. Cl.
CPC .............. *C08J 5/18* (2013.01); *B29C 65/7802* (2013.01); *B32B 7/022* (2019.01); *B32B 7/12* (2013.01); *B32B 33/00* (2013.01); *B41M 7/0027* (2013.01); *B65H 39/041* (2013.01); *B65H 39/045* (2013.01); *B32B 2307/412* (2013.01); *B32B 2367/00* (2013.01); *B32B 2405/00* (2013.01)

(58) Field of Classification Search
CPC ..... C08J 5/18; B32B 7/12; B32B 7/022; B32B 33/00; B32B 2405/00; B32B 2367/00; B32B 2307/412; B41M 7/0027; B65H 39/045; B65H 39/041; B29C 65/7802
See application file for complete search history.

(56) References Cited

U.S. PATENT DOCUMENTS

| | | | |
|---|---|---|---|
| 3,461,998 A | 8/1969 | Ploeger, Jr. | |
| 4,716,601 A | 1/1988 | McNeal | |
| 5,304,424 A | 4/1994 | Herb et al. | |
| 6,054,086 A * | 4/2000 | Kurihara et al. | B32B 37/144 264/210.8 |
| 8,088,462 B1 | 1/2012 | Cockman et al. | |
| 8,277,916 B2 | 10/2012 | Cockman et al. | |
| 8,470,111 B2 | 6/2013 | Boger et al. | |

(Continued)

OTHER PUBLICATIONS

EIC search (Year: 2023).*

*Primary Examiner* — Sonya M Sengupta
(74) *Attorney, Agent, or Firm* — Memminger E. Wiggins

(57) ABSTRACT

A protective film press using commercially available anti-graffiti film for the production of a multi-layer protective film. The invention provides a relatively simple and economical manufacturing device and method to produce a multi-layer protective film which has historically required expensive and complex methods and equipment. The protective film press comprising a frame chassis, a plurality of mounting assemblies detachably attached to the frame chassis, first and second motorized pull roller assemblies repositionably mounted on the frame chassis, a pair of pressure rollers that pneumatically press the anti-graffiti films into a vertically stacked multi-layer configuration, and at least one alignment roller repositionably mounted on the frame chassis. A preferred embodiment of present invention also includes means for controlling the speed at which the first and second motorized pull roller assemblies operate and also a means for providing pressure for the pair of pressure rollers.

12 Claims, 8 Drawing Sheets

(56) References Cited

U.S. PATENT DOCUMENTS

| | | |
|---|---|---|
| 9,442,306 B1 | 9/2016 | Hines et al. |
| 9,526,290 B2 | 12/2016 | Wilson |
| 10,093,076 B2 | 10/2018 | Gittere et al. |
| 2009/0233032 A1 | 9/2009 | Craig |
| 2012/0070603 A1 | 3/2012 | Hsu |
| 2013/0045371 A1 | 2/2013 | O'Donnell |
| 2017/0256810 A1 | 9/2017 | Lee |

\* cited by examiner

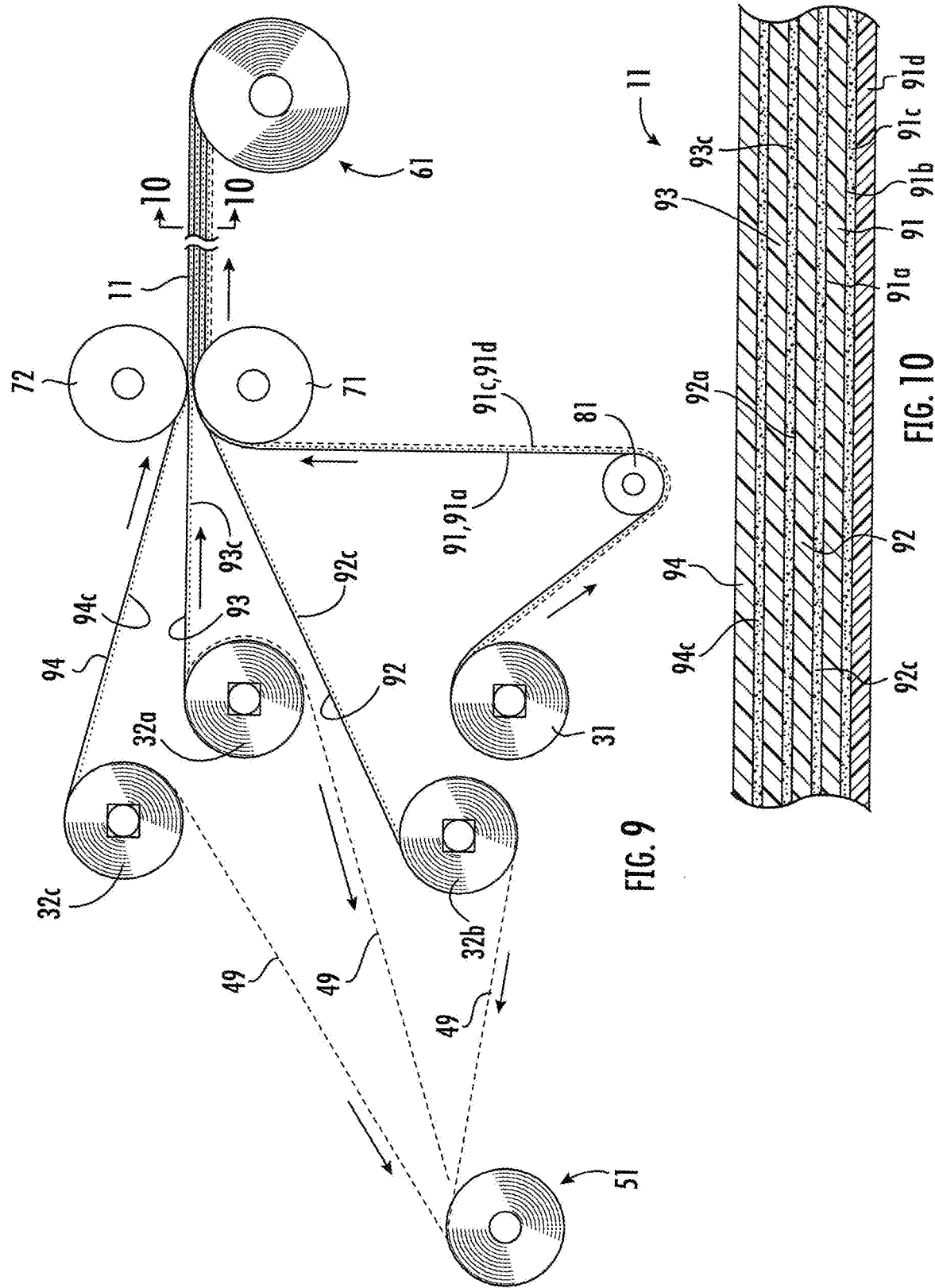

PROTECTIVE FILM PRESS AND METHOD OF USE

CROSS-REFERENCE TO RELATED APPLICATIONS

This application claims priority to and incorporates by reference herein U.S. Provisional Pat. Application Number 62/647936 filed on Mar. 26, 2018 and titled "Protective Film Press and Method of Use".

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING, A TABLE, OR A COMPUTER PROGRAM LISTING SUBMITTED ON A COMPACT DISC WITH APPENDIX

Not Applicable.

FIELD OF THE INVENTION

The present invention relates to a device for the production of multi-layer protective films and the method of using such a device for the production of such protective films. These protective films are often applied to the surface of objects to protect such objects from damage due to contact with dirt, debris, or physical contact with other objects.

BACKGROUND OF THE INVENTION

Anti-graffiti films and the like are often used for the protection of various kinds of surfaces. These protective films generally include a release liner covering a pressure sensitive adhesive which is pre-applied to one side of the protective film. To use the protective film the release liner is removed to expose the pressure sensitive adhesive layer, a water and soap solution is applied to adhesive layer surface and to the surface to which the protective film is to be applied, finally the adhesive film side of the protective film is pressed onto the surface to be protected. Subsequently, the protective film can be removed when necessary and replaced with another protective film. The present invention relates to a film press and method for producing removable multi-layer protective films using commonly available anti-graffiti films, safety films, window tint films, or the like. These protective films can be easily mounted to residential and commercial windows, mirrors, helmet visors, automotive windshields, display cases, road signs, and such other surfaces that could benefit from having a plurality of removable layers of protective film detachably affixed its surface. The design and configuration of the multi-layer protective film provides for the top layer of protective film to be easily removed once it becomes contaminated with dirt, debris, or graffiti. When the top layer of the multi-layer protective films becomes soiled, it can be peeled away to reveal a new clean protective film layer. Having the ability to simply peel off the top layer of multiple protective film layers eliminates the time and liquid cleaning products traditionally needed to clean any surface that is being protected by the protective film layer(s).

The protective film market continues to evolve with the advance of technology. The manufacture of these protective films can often involve very complex methods and sophisticated equipment. These methods and equipment may include the processing of the protective film with heated or refrigerated water and/or water baths, devices to produce heat or cold, steam coils, temperature sensing devices, humidity control mechanisms, heated pressure rollers, thermoplastic coating materials, moisture application to the protective film and/or to the surface to be protected, and such other materials and equipment and methods. Additionally, the production of the adhesive and the application of the adhesive to the protective film can similarly be complex and expensive. Unlike the equipment and processes that have been used in the past and the present, the present device and method for producing a multi-layer protective film is neither complex nor expensive.

SUMMARY OF THE INVENTION

There are numerous needs and uses for removable multi-layer protective films. In order to meet such needs and uses a variety of methods and kinds of equipment have evolved to produce removable multi-layer protective films for the market place. Unfortunately, removable multi-layer protective film production can be costly and time consuming in light of present equipment and production methods used.

The present invention is deigned and configured to mount and secure a plurality of anti-graffiti film rolls for the production of multi-layer protective films. The anti-graffiti films used in the present invention are generally purchased from commercial vendors as bulk rolls having certain lengths, widths, and thickness wound on hollow tubular cores. Such anti-graffiti film comprising a top side, a bottom side to which pressure sensitive adhesive has been applied, and a release liner removably attached to the pressure sensitive adhesive. Generally, in the present invention one roll of anti-graffiti film is needed for each layer of the multi-layer protective film produced. However, it is possible to combine previously produced multi-layer protective films of the present invention with another multi-layer protective film of the present invention to reduce the number of anti-graffiti film rolls needed to produce a multi-layer protective film having a specific number of removable protective films. Each roll of anti-graffiti film is mounted to a frame chassis via repositionable mounting assemblies designed and configured to engage each end of the hollow tubular core of the anti-graffiti film roll. Each mounting assembly comprising a tension control mechanism and a pinch roller. The tension control mechanism prevents the unwanted uncurling of the anti-graffiti film roll during the production of the multi-layer protective film. The pinch roller is designed and configured to be inserted within and to engage each end of the hollow tubular core of the anti-graffiti film roll as necessary to secure the anti-graffiti film roll to the frame chassis. In the present invention the release liner is mechanically removed from each of the upper layers of anti-graffiti film exposing the pressure sensitive adhesive layer that is adhered to the bottom side of each anti-graffiti film, but the release liner of the anti-graffiti film to serve as the bottom layer of anti-graffiti film remains attached. The exposed adhesive layer for each anti-graffiti film forming the upper layers of the multi-layer protective film is pressed onto the top surface of the anti-graffiti film below it to form stacked layers of removeable anti-graffiti film. The multiple layers of anti-graffiti films are all simultaneously pulled through a pair of pressure rollers where the individual layers of anti-graffiti film are pressed together in a stacked configuration forming a multi-layer protective film and then wound onto a tubular cylinder until needed for use.

The frame chassis and the mounting assemblies being designed and configured to permit repositioning of the mounting assemblies as may be necessary to accommodate and secure anti-graffiti film rolls of different widths and lengths. The present invention is designed and configured to process anti-graffiti rolls or sheets having a variety of widths, lengths, and thicknesses. The most common widths of anti-graffiti films processed by the present invention being from 6 inches to 60 inches. The most common thicknesses of anti-graffiti films processed by the present invention being from ½ mil to 12 mils.

Therefore, one object of the present invention is to provide a simple and efficient protective film press capable of producing multi-layer protective films that can be used for a variety of needs.

Another object of the present invention is the utilization of commercially available materials, such as anti-graffiti films, safety films, and window tint films, for the production of various kinds of multi-layer protective films. The use of such readily available films reduces the need to stock pile and warehouse large quantities of the raw materials normally required to produce multi-layer protective film products.

Yet another object of the present invention is to provide a film press which requires a minimum of floor space to relatively large quantities of multi-layer protective film.

Another object of the present invention is to make sample runs of multi-layer protective film of various lengths and widths.

Yet another object of the present invention is to produce an anti-graffiti film saving both on costs and time.

Another object of the present invention is the ability to make a variety of multi-layer protective film including tinted film, security film, and anti-graffiti film These and other objects of the present invention are achievable due to the simple design and functional configuration of the present invention and method. These and other objects of the present invention can be obtained in the preferred embodiments of the invention described below.

These and other objects of the present invention are achievable due to simple design and functional configuration of the present invention. These and other objects of the present invention can be obtained in the preferred embodiments of the invention described below.

BRIEF DESCRIPTION OF THE DRAWINGS

FIG. 9 is a schematic drawing of one embodiment of the present invention; and

FIG. 10 is a cross sectional view of a product produced by the present invention as shown along line 10-10 in FIG. 9.

DETAILED DESCRIPTION OF THE INVENTION

Figure 1:
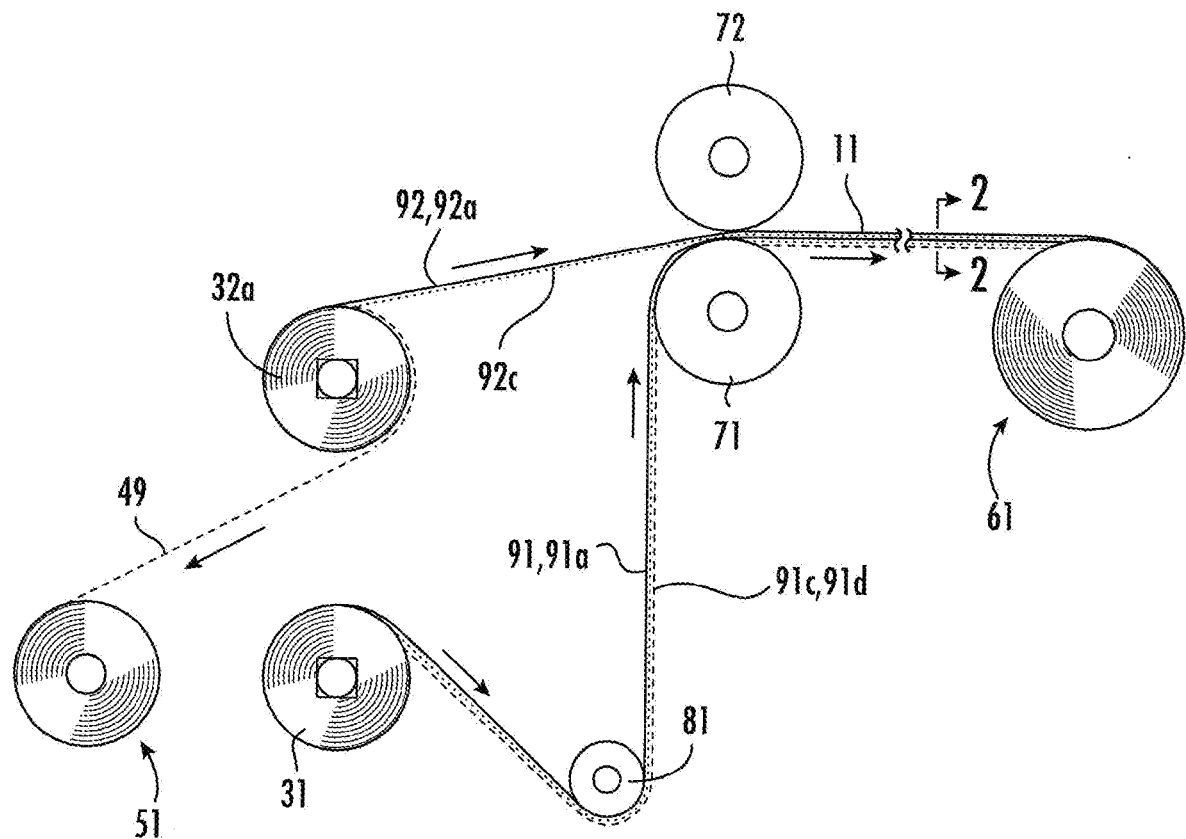
FIG. 1 is a schematic drawing of one embodiment of the present invention.

Reference will now be made in detail to one exemplary embodiment of the present invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the intended invention. Other objects, features, and aspects of the present invention are disclosed in the following detailed description. It is to be understood by one of ordinary skill in the art that the present discussion is a description of one exemplary embodiment only and is not intended as limiting the broader aspects of the present invention.

In describing the various figures herein, the same reference numbers are used throughout to describe the same material or apparatus, or process pathway. To avoid redundancy, detailed descriptions of much of the apparatus once described in relation to a figure may not be repeated in the descriptions of subsequent figures, although such apparatus or process is labeled with the same reference numbers.

A protective film press for the production of a multi-layer protective film according to a preferred embodiment of the present inventions is illustrated in FIGS. 1 to 11. One exemplary embodiment of the present invention can be generally described as a protective film press which uses commercially available optically clear anti-graffiti film to produce an economical and effective multi-layer protective film having a plurality of removable individual protective films vertically stacked on top of one another. In accordance with the present invention a protective film press for the production of a multi-layer protective film having a frame chassis 12, a plurality of repositionable mounting assemblies 21 that are detachably attached to the frame chassis 12 which can be repositioned as necessary to accommodate the various sized rolls of commercial anti-graffiti films used in the present invention, first and second motorized pull roller assemblies 61, 51 repositionably mounted on the frame chassis 12, a pair of pressure rollers 71, 72 that pneumatically press the anti-graffiti films into a vertically stacked multi-layer configuration, at least one alignment roller 81 repositionably mounted on the frame chassis 12 that is designed and configured to keep at least one roll of anti-graffiti film in parallel alignment during the production of the multi-layer protective film 11. A preferred embodiment of present invention also includes means 66, 56 for controlling the speed at which the first and second motorized pull roller assemblies 61, 51 operate, as well as a pair of anti-graffiti film edge trimmers 37.

A preferred embodiment of the present invention comprising a frame chassis 12 adapted to accommodate mounting a plurality of components used for the production of a multi-layer protective film from single layers of commercially available optically clear anti-graffiti film. A single layer commercial anti-graffiti film comprising an optically clear film layer with a pressure sensitive adhesive adhered to the bottom side of the graffiti film and a release liner removably attached to the pressure sensitive adhesive. To use the single layer anti-graffiti film the release liner is removed such that the pressure sensitive adhesive remains adhered to the bottom side of the anti-graffiti film and the anti-graffiti film is placed with the pressure sensitive adhesive side onto the surface which is to be protected.

The frame chassis 12 being designed and adapted to permit it to be assembled and reassembled into various configurations as may be needed to accommodate the variety of production components utilized in the present invention. The frame chassis being constructed of aluminum or such other material capable of providing sufficient structural integrity and support for the various components of the present invention. A plurality of repositionable mounting assemblies 21 are detachably attached to the frame chassis 12. The mounting assemblies are designed and adapted to mount at least a first upper anti-graffiti film roll 32a and bottom anti-graffiti film roll 31. The anti-graffiti film used in the present invention is generally supplied in rolls wound onto a hollow tubular core 34 with opposite open ends 35. Each of the repositionable mounting assemblies 21 include a pinch roller 23 that is adapted to engage the open ends of the hollow tubular core 34 onto which the anti-graffiti film is wound. The repositionable mounting assemblies 21 also include a tension controller 22 to prevent unintended unwinding of the anti-graffiti film as it is pulled from its roll during the production of the multi-layer protective film 11 and a locking member 24 to secure the repositionable mounting member on the frame chassis 12. The commercially available anti-graffiti film of the present invention can be supplied in rolls or in sheet form of different lengths, widths, and thickness from various manufacturers of anti-graffiti film such as MADICO®, SunTek®, and ASWF™, In a preferred embodiment of the present invention the widths of the anti-graffiti films for the production of a multi-layer protective film are from about 6 inches to 60 inches. Anti-graffiti films can be manufactured from materials such as polyethylene terephthalate (PET). Although a preferred embodiment of the present invention combines anti-graffiti films having the highest degree of optical clarity, additional embodiments may utilize one or more tinted anti-graffiti films exclusively or in combination with optically clear anti-graffiti film in the production of a multi-layer protective film. The degree of tint for tinted anti-graffiti in a preferred embodiment of the present invention ranges from very light to very dark depending on the purpose of the tint. Additionally, other aspects of the anti-graffiti film include a top surface, a bottom surface, a pressure sensitive adhesive layer adhered to the bottom surface of the anti-graffiti film, and also a release liner that is removably adjoined to the pressure sensitive adhesive layer of the anti-graffiti film. The bonding strength between the bottom surface of the anti-graffiti film and the pressure sensitive adhesive layer is greater than the bonding strength between the release liner and the pressure sensitive adhesive layer such that the pressure sensitive adhesive remains bound to the bottom surface of the anti-graffiti film when the release liner is removed from the anti-graffiti film.

Figure 3:
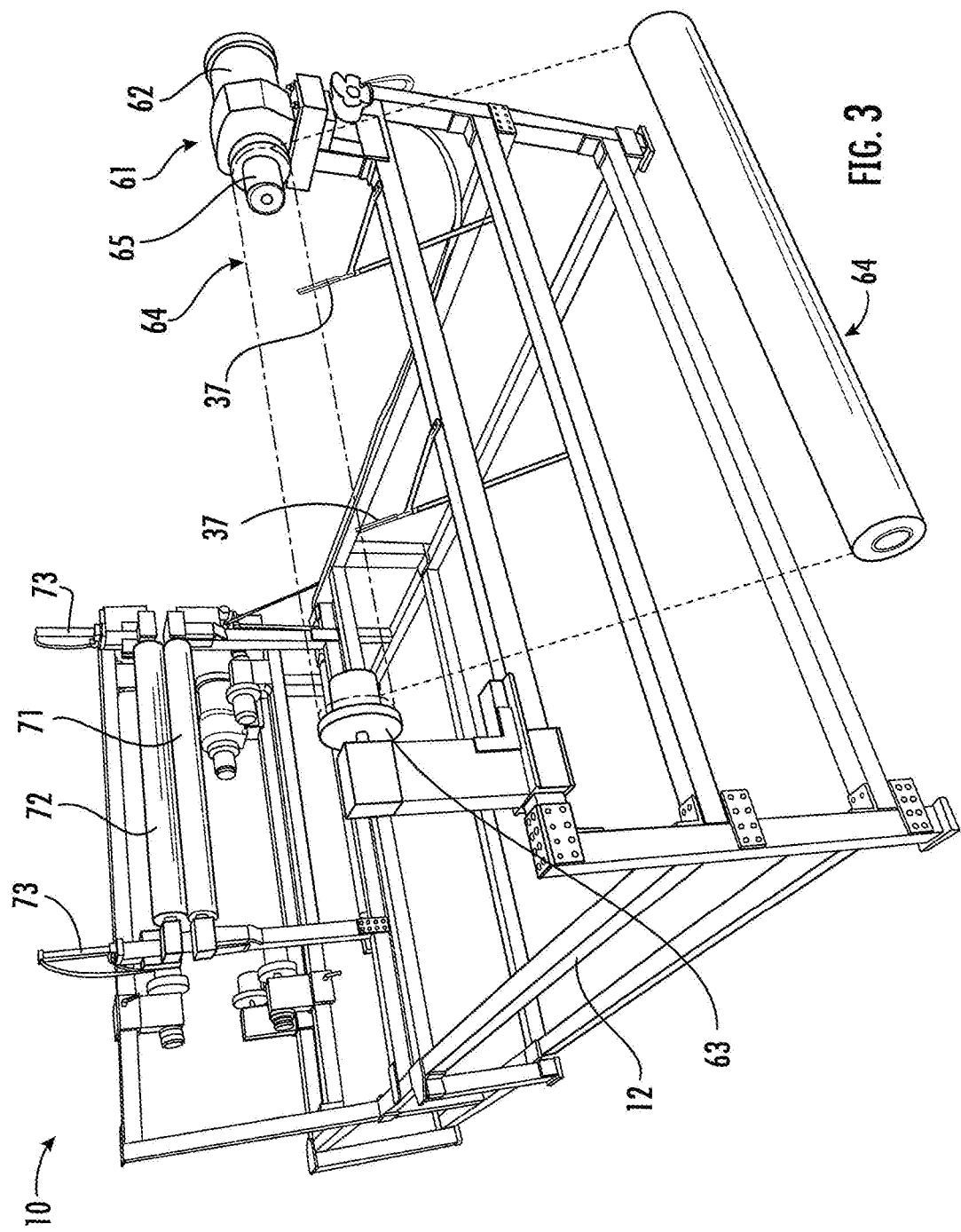
FIG. 3 is a front side perspective view of the present invention.
Figure 4:
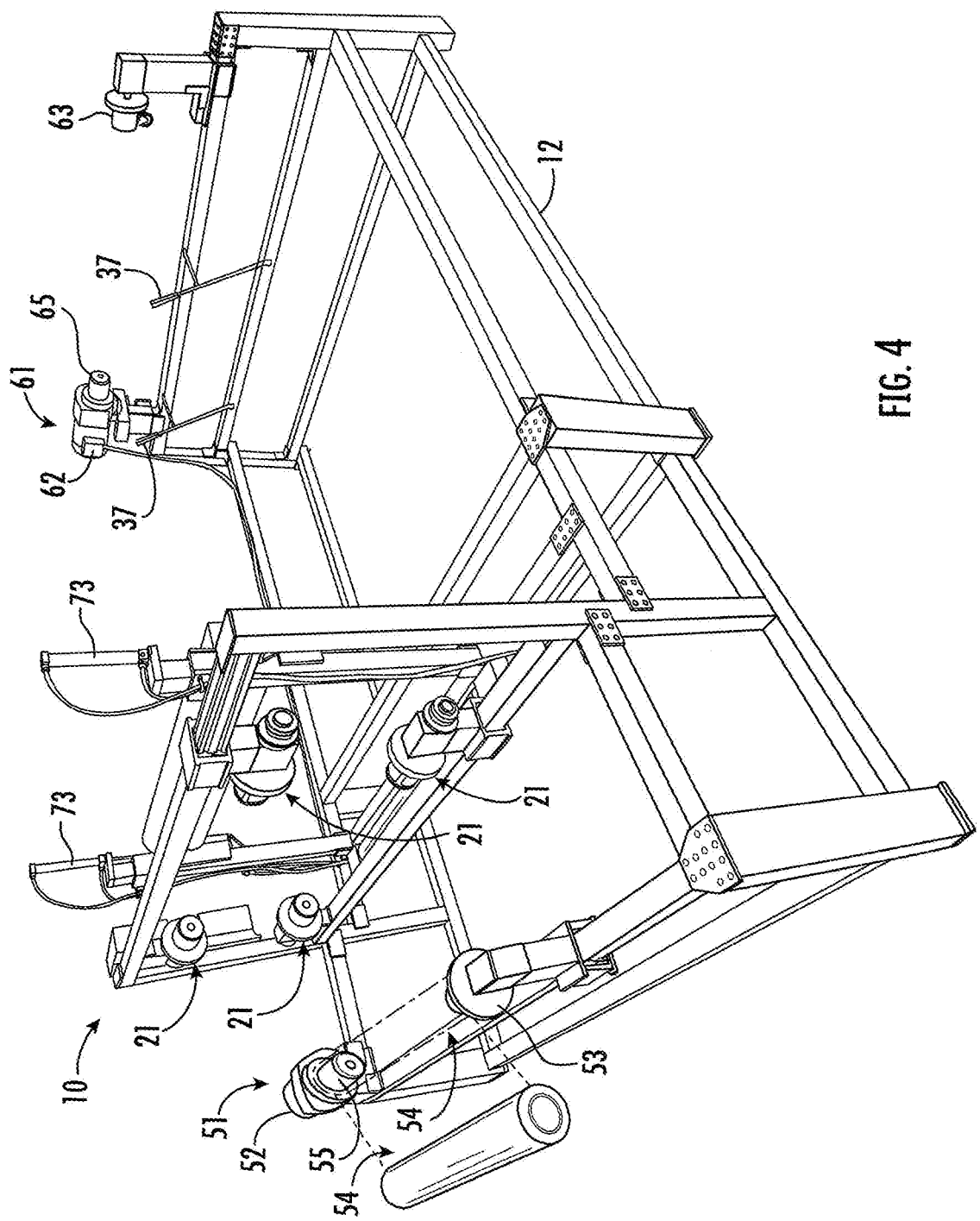
FIG. 4 is a rear side perspective view of the present invention.

Now referring to FIGS. 3 and 4, a preferred embodiment of the present invention includes a first motorized pull roller assembly 61 and a second motorized pull roller assembly 51 each being repositionable and detachably attached to the frame chassis 12. The first motorized pull roller assembly 61 of a preferred embodiment for the present invention is repositionably mounted on the frame chassis 12 and is adapted to simultaneously pull a length of the anti-graffiti film from at least the first upper anti-graffiti film roll 32a and from the bottom anti-graffiti film roll 31 for the production of a multi-layer protective film. The first motorized pull roller assembly 61 includes a first variable speed electric motor 62 coupled to a pinch roller 65 and adapted to drive said pinch roller 65, a repositionable first cylinder mounting member 63 is positioned horizontally opposite to the pinch roller 65, and a first tubular cylinder 64 onto which the multi-layer protective film is wound at the conclusion of its production run. Depending on the physical attributes of the multi-layer protective film 11 being produced such as thickness, width, and length, the diameter of the first tubular member 64 may be larger or smaller. The first tubular cylinder 64 having opposite open ends that are adapted and configured to engage the first variable speed electric motor 62 pinch roller 65 and the first cylinder mounting member 63.

Referring to FIGS. 1, 2, 4, 8, and 11, a preferred embodiment of the present invention includes a second motorized pull roller assembly 51 being adapted to pull the release liner 49 away from the pressure sensitive adhesive layer 92c of the at least said first upper anti-graffiti film roll 32a. The pressure sensitive adhesive layer having a greater bonding strength to the bottom surface of the anti-graffiti film than to the release liner 49 and therefore remains attached to the bottom surface of the anti-graffiti film on the removal of the release liner from the anti-graffiti film. Similar to the first motorized pull roller assembly 61, the second motorized pull roller assembly 51 includes a second variable speed electric motor 52 coupled to a pinch roller 55 and adapted to drive said pinch roller 55, a repositionable second cylinder mounting member 53 is positioned horizontally opposite to the pinch roller 55, and a second tubular cylinder 54 onto which the release liner 49 is wound as it is removed from at least said first upper anti-graffiti film roll 32a. The second tubular cylinder 54 having opposite open ends that are adapted and configured to engage the second motorized pull roller assembly 51 pinch roller 55 and the second cylinder mounting member 53.

Figure 5:
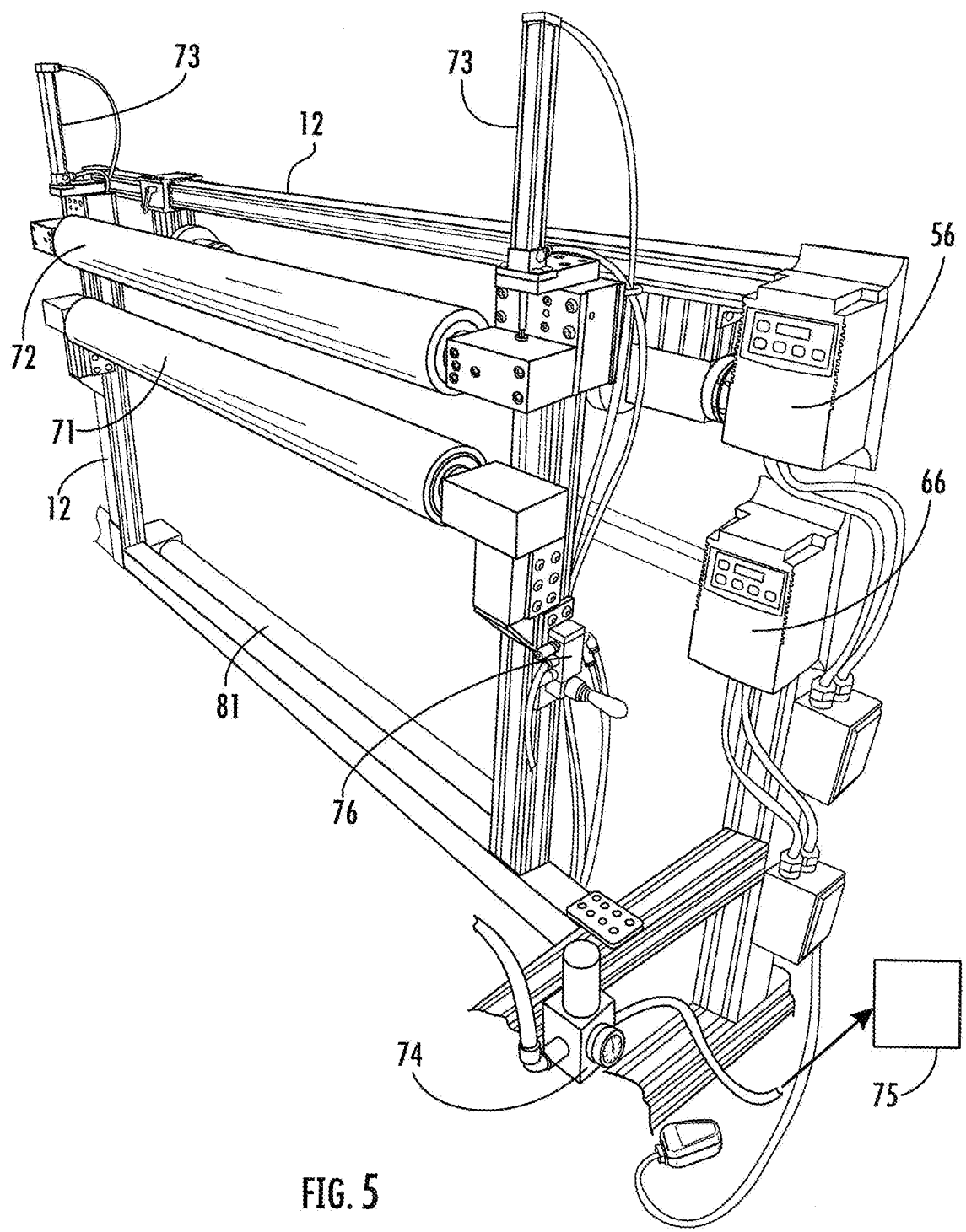
FIG. 5 is a close-up perspective view of the present invention showing a pair of pressure rollers in an open configuration.

As shown on FIGS. 3 and 5, one exemplary embodiment of the present invention discloses a first electric motor control unit 66 for the first motorized pull roller assembly 61 and a second electric motor control unit 56 for the second motorized pull roller assembly 51. The first electric motor control unit 66 for the first motorized pull roller assembly 61 controls the speed at which the first motorized pull roller assembly 61 turns the first tubular cylinder 64 onto which the multi-layer protective film 11 is wound at the end of its production run. This in turn effects the speed at which the anti-graffiti films are pulled through the pair of pressure rollers 71, 72 and which in turn effects the speed at which the second motorized pull roller assembly 51 must turn the second tubular cylinder 54 to remove the release liner 49 from the at least said first upper anti-graffiti film roll 32a. Failure to maintain the proper speed of the between these activities can interfere with the production of the multi-layer protective film.

Referring to FIGS. 3 and 4, in a preferred embodiment the present invention a pair of pressure rollers 71, 72 are detachably attached to the frame chassis 12 and disposed between the first and second motorized pull roller assemblies 61, 51. The first motorized pull roller assembly 61, the second motorized pull roller assembly 51, and the pair of pressure rollers 71, 72 being aligned with one another and the pair of pressure rollers 71, 72 and the first motorized pull roller assembly 61 being generally coplanar. Now referring to FIGS. 3, 4, 5 and 8, a preferred embodiment of the present invention the pair of pressure rollers 71, 72 include a stationary lower rubber roller 71, a pneumatic upper rubber roller 72 connected to a pair of pneumatic jacks 73 adapted and disposed to provide a pressure against said stationary lower rubber roller 71, a means for adjusting said pressure exerted by said pneumatic rubber roller against said stationary lower rubber roller 71, a means for raising and lowering said pneumatic upper rubber roller 72, and a source of pressurized air in communication with said pneumatic upper rubber roller 72. The present invention includes an adjustable pressure regulator 74 to maintain a preferred pressure of about 60 psi to be exerted by the pair of pressure rollers 71, 72 onto the anti-graffiti films as they are pulled through the pair of pressure rollers 71, 72. A pressure greater than 60 psi is often needed when using anti-graffiti films having lesser thicknesses and a psi less than 60 psi. is often needed for anti-graffiti films having greater thicknesses. A pneumatic jack switch 76 is provided in the present invention which directs air pressure to the pneumatic jack which directs the raising and lowering of the pneumatic upper rubber roller 72. The present invention also includes a general use air compressor 75 to provide compressed air to the pneumatic jacks as needed for the pneumatic upper rubber roller 72 to apply pressure to the anti-graffiti films passing between the pair of pressure rollers 71, 72.

Referring to FIG. 1 a preferred embodiment of the present invention includes at least one repositionable alignment roller mounted on the frame chassis 12. The alignment roller directs the anti-graffiti film that is pulled from the bottom roll of anti-graffiti film to the pair of pressure rollers 71, 72. The alignment roller also insures that the anti-graffiti film pulled from the bottom roll of anti-graffiti film does not interfere with any upper rolls of anti-graffiti film advancing to and through the pair of pressure rollers 71, 72.

As shown in FIGS. 3 and 4, one preferred embodiment of the present invention discloses at least one pair of anti-graffiti film edge trimmers 37 repositionably mounted on the frame chassis 12 disposed between the pair of pressure rollers 71, 72 and said first motorized pull roller assembly 61. The anti-graffiti film edge trimmers 37 comprising sharpened blade members to cut away any edge irregularities due to improper alignment of the anti-graffiti film rolls before and during the film's passage though the pair of pressure rollers 71, 72.

Figure 2:
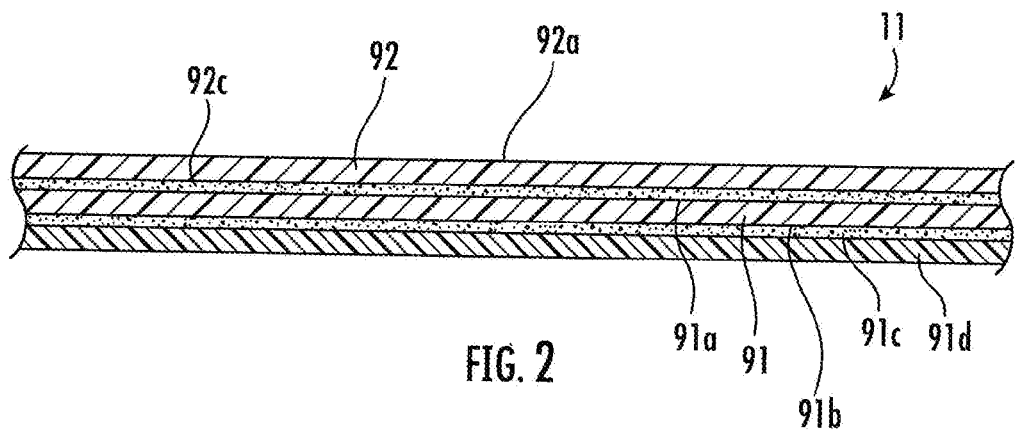
FIG. 2 is a cross sectional view of a product produced by the present invention as shown along line 2-2 in FIG. 1.

Now referring to FIGS. 1, 2, 3, and 4, in one preferred embodiment of the present invention the pair of pressure rollers 71, 72 being adapted and configured to press said length of said anti-graffiti film 92 without its release liner 49, from at least said first upper anti-graffiti film roll 32a and said length of said anti-graffiti film 91 from said bottom anti-graffiti film roll 31 together as said length of said anti-graffiti film 92 from at least said first upper anti-graffiti film roll 32a and said length of said anti-graffiti film from said bottom anti-graffiti film roll 31 are simultaneously pulled through the pair of pressure rollers 71, 72 by said first motorized pull roller assembly 61 to form the multi-layer protective film 11 having a plurality of removeable individual anti-graffiti films as shown in FIGS. 1 and 2.

Referring to the schematic of FIG. 1, in one exemplary embodiment of the present invention the pressure sensitive adhesive layer 92c of the anti-graffiti film 92 of the at least said first upper anti-graffiti film roll 32a, after its release liner is removed by the second motorized pull roller assembly 51, is removeably adjoined to the top surface 91a of the anti-graffiti film 91 from the bottom anti-graffiti film roll 31. Additionally, the release liner 91d of the anti-graffiti film 91 from the bottom anti-graffiti film roll 31 remains removably attached to the bottom surface 91b of the bottom anti-graffiti film roll 31 until it is removed and the multi-layer protective film 11 having a plurality of removable individual anti-graffiti films, is removeably affixed to a surface of an object for protection of such object.

Figure 11:
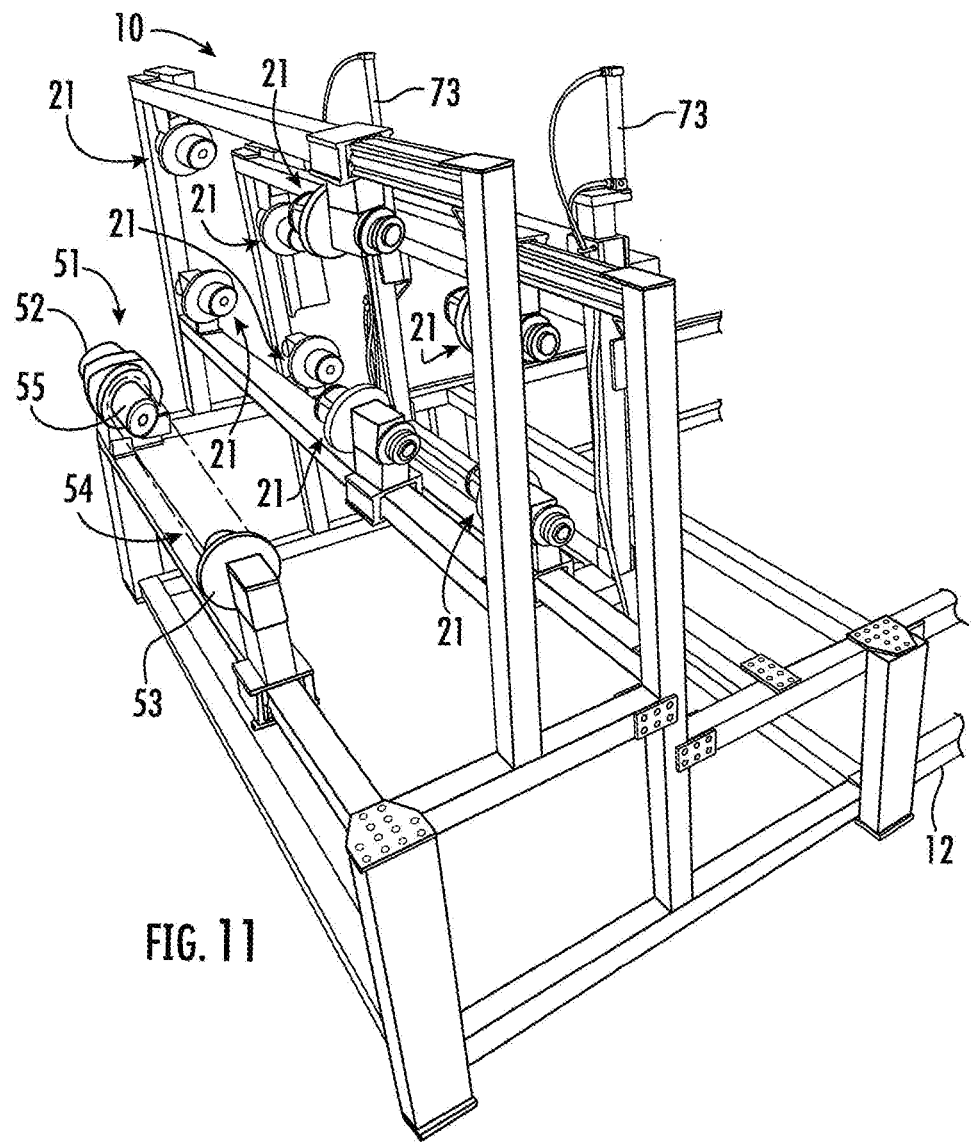
FIG. 11 is a partial rear side perspective view one embodiment of the present invention.

Similarly to the preferred embodiment of the present invention disclosed in FIGS. 1, 2, 3, and 4, another preferred embodiment of the present invention is shown in FIGS. 9, 10, and 11, where three upper anti-graffiti film rolls 32a, 32b, 32c and one bottom anti-graffiti film roll 31 are mounted on the protective film press 10. The release liner 49 of the three upper anti-graffiti film rolls is removed by the second motorized pull roller assembly 51 just prior to the anti-graffiti films 92, 93, 94 from the three upper anti-graffiti film rolls and the one bottom anti-graffiti film roll 31 are pulled through the pair of pressure rollers 71, 72 to where the anti-graffiti films are removable adhered one another to form a multi-layer protective film 11 having four removable layers. Alternative embodiments of the present invention include the production multi-layered protective films where previously produced multi-layer protective films are processed in the same manner as one upper anti-graffiti film roll and one bottom anti-graffiti roll to produce a multi-layer protective film having a number of protective layers equal to the combined number of protective layers of the upper anti-graffiti film roll and the bottom anti-graffiti film roll 31. For example, processing two previously produced 2-layer multi-layer protective films in the same manner as one upper anti-graffiti film roll and one bottom anti-graffiti roll will yield a multi-layer protective film having four protective layers.

Figure 6:
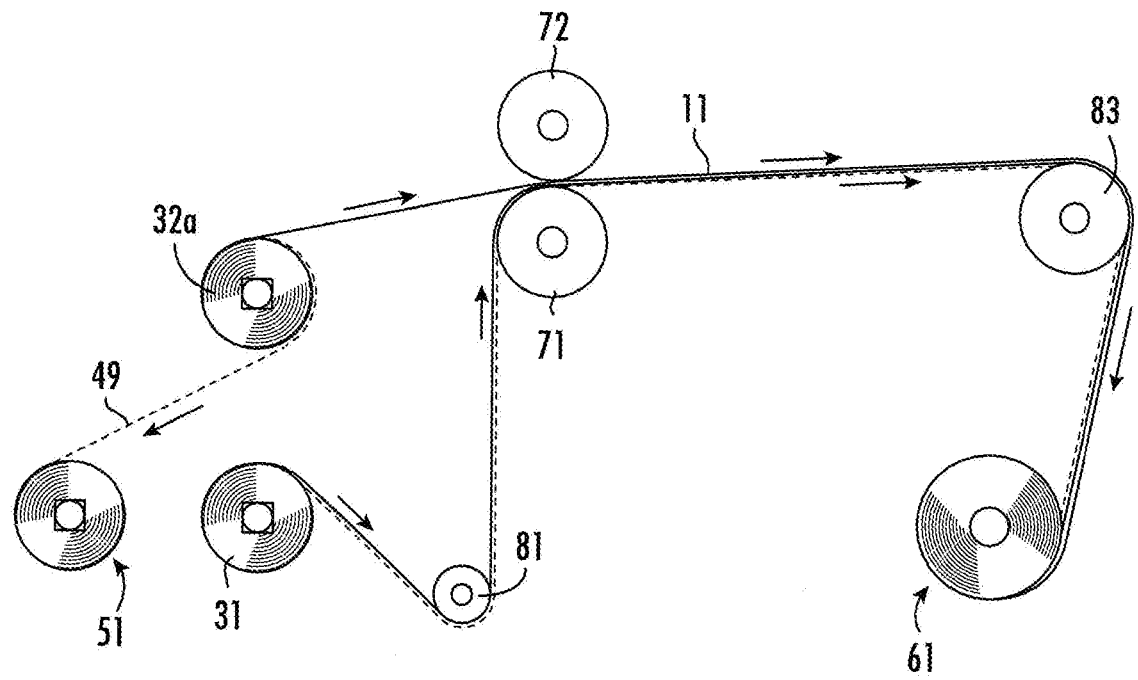
FIG. 6 is a schematic drawing of one embodiment of the present invention.
Figure 7:
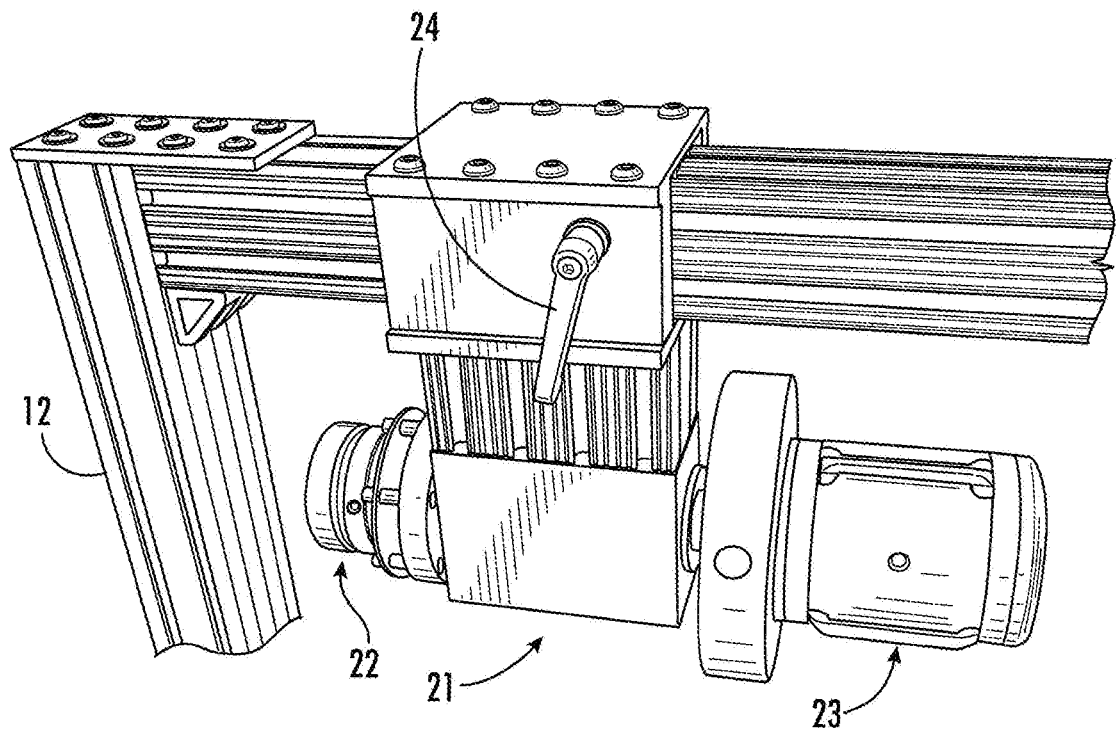
FIG. 7 is a close-up perspective view of the present invention showing a repositionable mounting assembly.
Figure 8:
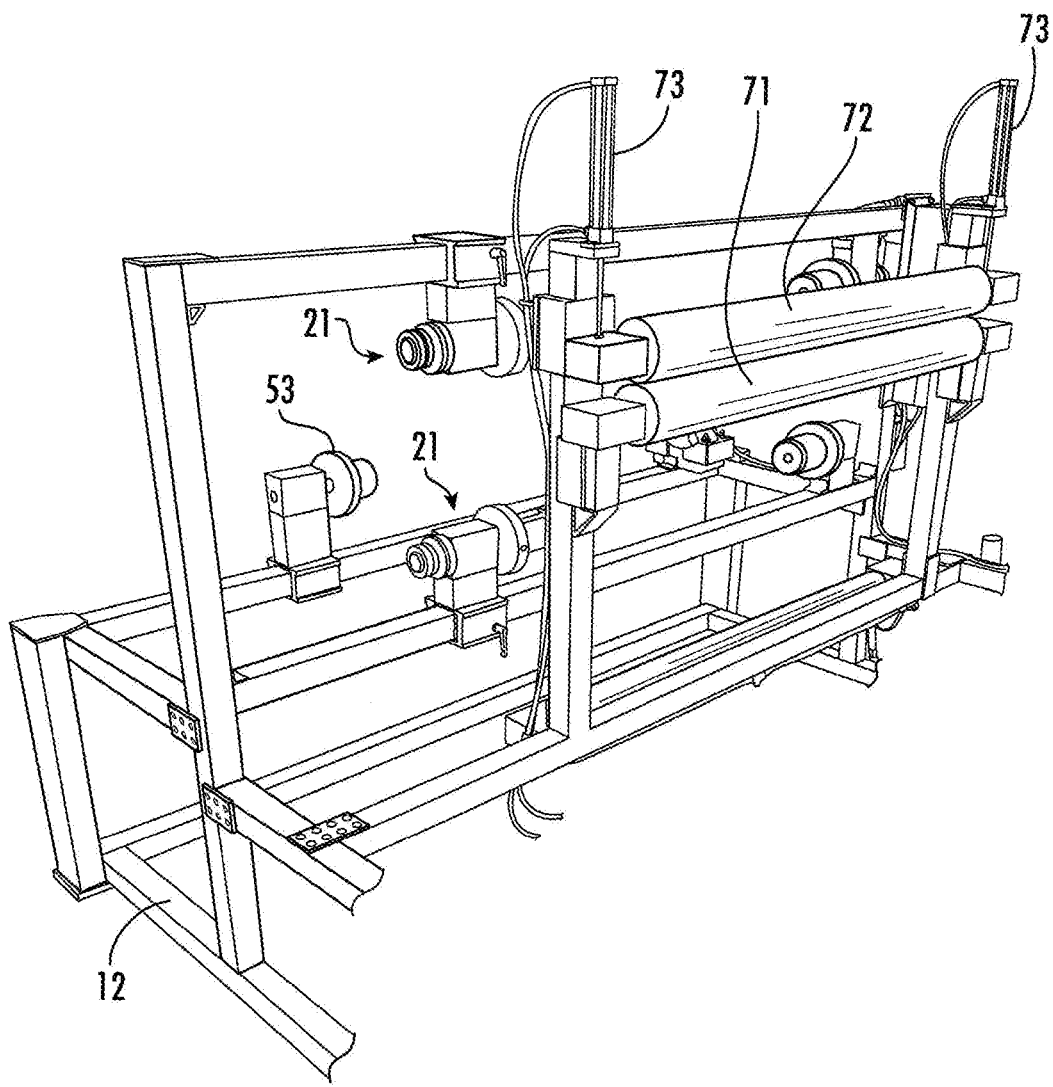
FIG. 8 is a close-up perspective view of the present invention showing a pair of pressure rollers 71, 72 in a closed configuration.

Another preferred embodiment of the present invention is shown in the schematic disclosed in FIG. 6 showing an extension roller 83 detachably attached to the frame chassis 12. The extension roller 83 directs the path of said multi-layer protective film 11 downward 90 degrees to the first motorized pull roller assembly 61. The first motorized pull roller assembly 61 being relocated to a position below said extension roller 83. This configuration providing the frame chassis 12 a shorter overall length and therefore requiring less physical space in which to produce the multi-layer protective film 11.

Many of the current processes to produce multi-layer protective films utilize complex and costly equipment and methodology. However, the present invention provides a protective film press which is simple in design and operation as well as economical due to its ability to use commercially available anti-graffiti films to produce a high multi-layer protective film.

Now generally referring to FIGS. 1 to 11, to use the present invention to produce a desired multi-layer protective film having a desired number of protective film layers, a desired thickness, a desired width, and a desired length, commercial rolls of anti-graffiti film are acquired as necessary. The use of three and four rolls of anti-graffiti film with the present invention will produce a multi-layer protective film having three or four removable protective film layers accordingly. However, it is possible to combine previously produced multi-layer protective films of the present invention with another multi-layer protective film of the present invention to increase the number of protective film layers without adding additional rolls of anti-graffiti film to the present invention.

The rolls of anti-graffiti are mounted in alignment with each other onto the frame chassis 12 of the present invention by inserting the pinch roller 23s of the repositionable mounting assemblies 21 into the opposite open ends 35 of the hollow tubular core 34 onto which the anti-graffiti film is wound. The tension controller 22 on each of the repositionable mounting assemblies 21 is adjusted to prevent the mounted anti-graffiti film from turning freely and thus have the anti-graffiti film unwind. The anti-graffiti film rolls are mounted on the frame chassis 12 so that the path of the anti-graffiti film to and through the pair of pressure rollers 71, 72 is not obstructed by the path of other anti-graffiti film from other anti-graffiti film rolls nor the path of any release liner of any anti-graffiti film roll to the second tubular cylinder 54 mounted onto the frame chassis 12 via the second motorized pull roller assembly 51. Additionally, the first To begin the production process for the multi-layer protective film the pair of pressure rollers 71, 72 is put into the open position via the pneumatic jack switch 76 and anti-graffiti film from the bottom anti-graffiti film roll 31 is advanced and passed through the pair of pressure rollers 71, 72 toward the first tubular cylinder 64. In similar fashion anti-graffiti film from the at least said first upper anti-graffiti film roll 32a is also advanced and passed through the pair of pressure rollers 71, 72 toward the first tubular cylinder 64. However, as the anti-graffiti film from the at least a first upper anti-graffiti film roll 32a is advanced toward the pair of pressure rollers 71, 72 its release liner 49 is pulled off the pressure sensitive adhesive and towards the second tubular cylinder 54 where it is secured for the receipt of additional release liner once the production process is initiated. At a point at or near the pair of pressure rollers 71, 72 the pressure sensitive adhesive of at least said first upper anti-graffiti film roll 32a is pressed directly onto the top surface 91a of the bottom anti-graffiti film 91. Once the bottom anti-graffiti film and the at least said first upper anti-graffiti film are manually combined and advanced past the pair of pressure rollers 71, 72, the pair of pressure rollers 71, 72 is put into its closed position such that the pneumatic upper rubber roller 72 is disposed against the stationary lower rubber roller 71 and pressure of about 60 psi is applied to the combined bottom anti-graffiti film and the least said first upper anti-graffiti film such that the multi-layer protective film 11 is formed. The multi-layer protective film 11 is manually advanced to the first tubular cylinder 64 where it is secured in preparation of beginning a production run for the multi-layer protective film 11.

As shown in FIGS. 1 and 2; the production run for the multi-layer protective film 11 is initiated once the first motorized pull roller assembly 61 begins to simultaneously pull the bottom anti-graffiti film 91 from the bottom anti-graffiti film roll 31 and at least said first upper anti-graffiti film 92 from its at least said first upper anti-graffiti film roll 32a through the pair of pressure rollers 71, 72 and the second motorized pull roller assembly 51 begins to pull the release liner 49 from the at least said first upper anti-graffiti film roll 32a such that the release liner 49 is wound onto the second tubular cylinder 54. The speed at which the first variable speed electric motor 62 turns the first tubular cylinder 64 is controlled by the first electric motor control unit 66 and the speed at which the second variable speed electric motor 52 turns the second tubular cylinder 54 is controlled by the second electric motor control unit 56. Since the diameter of the first tubular cylinder 64 increases as the multi-layer protective film 11 is wound onto the first tubular cylinder 64, and similarly the diameter of the second tubular cylinder 54 increases as release liner 49 is wound onto the second tubular cylinder 54, it is necessary to constantly monitor and adjust the speeds of the first motorized pull roller assembly 61 and the second motorized pull roller assembly 51 so that the speed at which the anti-graffiti films 91, 92 pass through the pair of pressure rollers 71, 72 remains constant to insure optimal bonding of the pressure sensitive adhesive 92c of at least said first upper anti-graffiti film roll 32a to the top surface 91a of the bottom anti-graffiti film 91 and to maintain the removeable aspect of the individual protective film layers in multi-layer protective film 11. Additionally, in a preferred embodiment of the present invention, a distance of about six feet from the pair of pressure rollers 71, 72 to the first tubular cylinder 64 helps to reduce the inherent curl of the multi-layer protective film 11 sometimes encountered during a production run.

At the end of the multi-layer protective film production run, the multi-layer protective film may be stored as a roll form of multi-layer protective film or unwound and cut into flat lying sheets having a multitude of dimensions. Upon the removal of the release liner on the bottom anti-graffiti film the multi-layer protective film can be removeably attached to a variety of surfaces such as mirrors, windows in homes or on vehicles, display cases, signage, or practically any other flat surface that could benefit from the protection offered by the multi-layer protective film having removable individual films stacked on top of one another being produced by the present invention.

Although preferred embodiments of the present invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged either in whole, or in part. Therefore, the spirit and scope of the invention should not be limited to the description of the preferred embodiments contained herein.

What is claimed is:
1. A protective film press comprising:
a frame chassis adapted to mount a plurality of anti-graffiti film rolls for the production of a multi-layer protective film, each of said anti-graffiti film rolls comprising an optically clear anti-graffiti film wound onto a hollow tubular core having opposite open ends,
wherein each of said anti-graffiti films having a length, a width being defined by first and second edges of said anti-graffiti film said edges being parallel to one another, a thickness, a top surface, a bottom surface, a pressure sensitive adhesive layer adhered to said bottom surface of said anti-graffiti film, and a release liner removably adjoined to said pressure sensitive adhesive layer;
a plurality of repositionable mounting assemblies detachably attached to said frame chassis, said mounting assemblies adapted to mount said plurality of anti-graffiti film rolls to said frame chassis in alignment with one another, said repositionable mounting assemblies adapted to engage said opposite open ends of said hollow tubular cores of the anti-graffiti rolls, wherein said plurality of anti-graffiti film rolls comprising a bottom anti- graffiti film roll and at least a first upper anti-graffiti film roll;
a first motorized pull roller assembly detachably attached to said frame chassis and being adapted to simultaneously pull a length of said anti-graffiti film from at least said first upper anti-graffiti film roll and a length of said anti-graffiti film from said bottom anti-graffiti film roll;
a second motorized pull roller assembly detachably attached to said frame chassis and being adapted to pull said release liner away from said pressure sensitive adhesive layer of at least said first upper anti-graffiti film roll as said second motorized pull roller assembly pulls said length of said anti-graffiti film from at least said first upper anti-graffiti film roll, said pressure sensitive adhesive layer having a greater bonding strength to said bottom surface of at least said first upper anti-graffiti film roll than to said release liner such that said pressure sensitive adhesive layer remains adhered to said bottom surface of at least said first upper anti-graffiti film roll upon removal of said release liner;
a pair of pressure rollers attached to said frame chassis between said first motorized pull roller assembly and said second motorized pull roller assembly adapted to press said length of said anti-graffiti film from at least said first upper anti-graffiti film roll and said length of said anti-graffiti film from said bottom anti-graffiti film roll together as said length of said anti-graffiti film from at least said first upper anti-graffiti film roll and said length of said anti-graffiti film from said bottom anti-graffiti film roll are simultaneously pulled through said pair of pressure rollers by said first motorized pull roller assembly, whereby said the adhesive layer of the upper anti-graffiti film is pressed onto the top surface of the bottom anti-graffiti film;
at least one alignment roller repositionably mounted on said frame chassis adapted to provide parallel alignment of said length of said anti-graffiti film from said bottom anti-graffiti film roll with said length of said anti-graffiti film from at least said first upper anti-graffiti film roll as said lengths are pulled through said pair of pressure rollers;
at least one pair of anti-graffiti film edge trimmers repositionably mounted on said frame chassis disposed between said pair of pressure rollers and said second motorized pull roller assembly.

2. The protective film press of claim 1, furthering comprising a means for controlling the speed of said first motorized pull roller assembly and a means for controlling the speed of said second motorized pull roller assembly.

3. The protective film press of claim 1, wherein said pair of pressure rollers comprising a stationary lower rubber roller, a pneumatic upper rubber roller in communication with a pair of pneumatic jacks adapted and disposed to provide a pressure against said stationary lower rubber roller, a means for adjusting said pressure exerted by said pneumatic rubber roller against said stationary lower rubber roller, a means for raising and lowering said pneumatic upper rubber roller, and a source of pressurized air in communication with said pneumatic upper rubber roller.

4. The protective film press of claim 1, wherein each of said plurality of repositionable mounting assemblies comprising a tension controller to prevent unwinding of said anti-graffiti film, a pinch roller adapted to engage said open ends of said hollow tubular core on which said anti-graffiti film is wound, and a locking member to secure said repositionable mounting assembly on said frame chassis.

5. The protective film press of claim 1, wherein said first motorized pull roller assembly comprising a first variable speed electric motor coupled to a pinch roller and adapted to drive said pinch roller, a first cylinder mounting member disposed horizontally opposite to said pinch roller, a first tubular cylinder onto which said multi-layer protective film is wound, said first tubular cylinder having opposite open ends, wherein said pinch roller and said cylinder.

6. The protective film press of claim 1, wherein said second motorized pull roller assembly comprising a second variable speed electric motor coupled to a pinch roller and adapted to drive said pinch roller, a second cylinder mounting member disposed horizontally opposite to said pinch roller, and a second tubular cylinder onto which said release liner is wound as it is removed from at least said first upper anti-graffiti film roll, said second tubular cylinder having opposite open ends, said opposite open ends of said second tubular cylinder adapted to engage said pinch roller and said second cylinder mounting member.

7. The protective film press of claim 1, wherein said width of said anti-graffiti film is about 6 inches to about 60 inches.

8. The protective film press of claim 1, wherein said thickness of said anti-graffiti film is about ½ mil to about 12 mil.

9. The protective film press of claim 1, wherein said anti-graffiti film and said pressure sensitive adhesive are optically clear.

10. The protective film press of claim 1, wherein at least one anti-graffiti film is tinted.

11. A method of using a protective film press comprising the steps of:
providing a frame chassis adapted to produce a multi-layer protective film;
acquiring a plurality of anti-graffiti rolls from at least one commercial vendor, each of said anti-graffiti film rolls comprising an optically clear anti-graffiti film wound onto a hollow tubular core having opposite open ends,
wherein said anti-graffiti film having a length, a width being defined by first and second edges of said anti-graffiti film said edges being parallel to one another, a thickness, a top surface, a bottom surface, a pressure sensitive adhesive layer adhered to said bottom surface of said anti-graffiti film, and a release liner removably adjoined to said pressure sensitive adhesive layer;
providing a plurality of repositionable mounting assemblies detachably attached to said frame chassis, said mounting assemblies adapted to mount a plurality of anti-graffiti film rolls to said frame chassis in alignment with one another, said repositionable mounting assemblies adapted to engage said opposite open ends of said hollow tubular cores of the anti-graffiti rolls, wherein said plurality of anti-graffiti film rolls comprising a bottom anti-graffiti film roll and at least a first upper anti-graffiti film roll;
wherein each of said plurality of repositionable mounting assemblies further comprising a tension controller to prevent unwinding of said anti-graffiti film, a pinch roller adapted to engage said open ends of said hollow tubular core on which said anti-graffiti film is wound, and a locking member to secure said repositionable mounting assembly on said frame chassis;
providing a first motorized pull roller assembly detachably attached to said frame chassis and being adapted to simultaneously pull said length of said anti-graffiti film from at least said first upper anti-graffiti film roll and said length of said anti-graffiti film from said bottom anti-graffiti film roll, wherein said first motorized pull roller assembly comprising a first variable speed electric motor coupled to a pinch roller and adapted to drive said pinch roller, a first cylinder mounting member disposed horizontally opposite to said pinch roller, a first tubular cylinder 64 onto which said multi-layer protective film is wound, said first tubular cylinder having opposite open ends, wherein said pinch roller and said cylinder;

providing first electric motor control unit to control the speed at which said first motorized pull roller assembly simultaneously pulls said length of said anti-graffiti film from at least said first upper anti-graffiti film roll and said length of said anti-graffiti film from said bottom anti-graffiti film roll, providing a second motorized pull roller assembly detachably attached to said frame chassis and being adapted to pull said release liner away from said pressure sensitive adhesive layer of at least said first upper anti-graffiti film roll as said second motorized pull roller assembly pulls said length of said anti-graffiti film from at least said first upper anti-graffiti film roll, said pressure sensitive adhesive layer having a greater bonding strength to said bottom surface of at least said first upper anti-graffiti film roll than to said release liner such that said pressure sensitive adhesive layer remains adhered to said bottom surface of at least said first upper anti-graffiti film roll upon removal of said release liner, wherein said second motorized pull roller assembly a second variable speed electric motor coupled to a pinch roller and adapted to drive said pinch roller, a second cylinder mounting member disposed horizontally opposite to said pinch roller, and a second tubular cylinder onto which said release liner is wound as it is removed from at least said first upper anti-graffiti film roll, said second tubular cylinder having opposite open ends, said opposite open ends of said second tubular cylinder adapted to engage said pinch roller and said second cylinder mounting member;

providing a second electric motor control unit to control the speed at which said second motorized pull roller assembly pulls said release liner away from said pressure sensitive adhesive layer of at least said first upper anti-graffiti film roll;

providing a pair of pressure rollers attached to said frame chassis between said first motorized pull roller assembly and said second motorized pull roller assembly adapted to press said length of said anti-graffiti film from at least said first upper anti-graffiti film roll and said length of said anti-graffiti film from said bottom anti-graffiti film roll together as said length of said anti-graffiti film from at least said first upper anti-graffiti film roll and said length of said anti-graffiti film from said bottom anti-graffiti film roll are simultaneously pulled through said pair of pressure rollers by said first motorized pull roller assembly, whereby said the adhesive layer of the upper anti-graffiti film is pressed onto the top surface of the bottom anti-graffiti film, wherein said pair of pressure rollers comprising a stationary lower rubber roller, a pneumatic upper rubber roller in communication with a pair of pneumatic jacks adapted and disposed to provide a pressure against said stationary lower rubber roller, a means for adjusting said pressure exerted by said pneumatic rubber roller against said stationary lower rubber roller, a means for raising and lowering said pneumatic upper rubber roller, and a source of pressurized air in communication with said pneumatic upper rubber roller;

providing at least one alignment roller repositionably mounted on said frame chassis adapted to provide parallel alignment of said length of said anti-graffiti film from said bottom anti-graffiti film roll with said length of said anti-graffiti film from at least said first upper anti-graffiti film roll as said lengths are pulled through said pair of pressure rollers;

providing at least one pair of anti-graffiti film edge trimmers repositionably mounted on said frame chassis disposed between said pair of pressure rollers and said second motorized pull roller assembly.

12. The method of claim 11, wherein said width of said anti-graffiti film is about 6 inches to about 60 inches and said thickness of said anti-graffiti film is about ½ mil to about 12 mil.

* * * * *